(12) United States Patent
Xiong

(10) Patent No.: US 12,541,904 B2
(45) Date of Patent: Feb. 3, 2026

(54) ELECTRONIC DEVICE, METHOD FOR PROMPTING FUNCTION SETTING OF ELECTRONIC DEVICE, AND METHOD FOR PLAYING PROMPT FILE

(71) Applicant: Huawei Technologies Co., Ltd., Shenzhen (CN)

(72) Inventor: Shiyi Xiong, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 275 days.

(21) Appl. No.: 18/301,778

(22) Filed: Apr. 17, 2023

(65) Prior Publication Data

US 2023/0260189 A1 Aug. 17, 2023

Related U.S. Application Data

(63) Continuation of application No. PCT/CN2021/124643, filed on Oct. 19, 2021.

(30) Foreign Application Priority Data

Oct. 22, 2020 (CN) .......................... 202011140810.9

(51) Int. Cl.
*G06T 13/80* (2011.01)
*G06T 11/00* (2006.01)
*G06V 40/60* (2022.01)

(52) U.S. Cl.
CPC ............ *G06T 13/80* (2013.01); *G06T 11/001* (2013.01); *G06V 40/67* (2022.01)

(58) Field of Classification Search
CPC ........ G06T 11/001; G06T 11/20; G06T 11/00; G06T 13/80; G06F 21/32
See application file for complete search history.

(56) References Cited

U.S. PATENT DOCUMENTS

2015/0049093 A1* 2/2015 Doll ........................ G06T 13/60
345/473
2015/0074615 A1* 3/2015 Han ...................... H04W 12/06
715/863

(Continued)

FOREIGN PATENT DOCUMENTS

CN 104901939 A 9/2015
CN 106251390 A 12/2016
CN 109816759 A 5/2019

OTHER PUBLICATIONS

Quicktipsto:"How to add or delete fingerprints to your iphone ios 11." May 2, 2018. total 2 pages. [online]https://www.youtube.com/watch?v=qtVRS-Vt6_c.

(Continued)

*Primary Examiner* — Ryan McCulley
(74) *Attorney, Agent, or Firm* — Slater Matsil, LLP

(57) ABSTRACT

In an embodiment a method includes displaying, by an electronic device, a first sequence frame image of a prompt file in response to a first operation performed by a user and displaying, by the electronic device, a second sequence frame image of the prompt file in response to a second operation performed by the user, wherein the prompt file comprises at least first-part contour information and second-part contour information of a playing object, wherein the first sequence frame image is generated based on the first-part contour information of the playing object, and wherein the second sequence frame image is generated based on the second-part contour information of the playing object and comprises content of the first sequence frame image.

20 Claims, 11 Drawing Sheets

(56) References Cited

U.S. PATENT DOCUMENTS

2016/0239701 A1* 8/2016 Lee .................... G06V 40/1335
2018/0337786 A1* 11/2018 Hart ........................ G06F 21/10
2019/0325244 A1  10/2019 Das

OTHER PUBLICATIONS

Samsung:"S10 series fingerprint entry craftsmanship," (Jan. 3, 2020), [online] https://jingyan.baidu.com/article/11c17a2c5b8bb6b447e39d46.html, total 42 pages (with Translation).

* cited by examiner

ELECTRONIC DEVICE, METHOD FOR PROMPTING FUNCTION SETTING OF ELECTRONIC DEVICE, AND METHOD FOR PLAYING PROMPT FILE

CROSS-REFERENCE TO RELATED APPLICATIONS

This application is a continuation of International Application No. PCT/CN2021/124643, filed on Oct. 19, 2021, which claims priority to Chinese Patent Application No. 202011140810.9, filed on Oct. 22, 2020. The disclosures of the aforementioned applications are hereby incorporated by reference in their entireties.

TECHNICAL FIELD

This application relates to the field of computer animation technologies, and in particular, to an electronic device, a method for prompting function setting of an electronic device, a method for playing a prompt file, and a medium.

BACKGROUND

To enable users to quickly and correctly master some features of terminal devices, for example, fingerprint recording functions on mobile phones or tablet computers, animations or videos need to be played to guide the users to perform related operations. For example, in a process in which a user records a fingerprint by using a fingerprint recording function, when the user presses a screen and releases a finger, an animation in which an incomplete fingerprint is morphed into a complete fingerprint may be played, to guide the user to enter the complete fingerprint. However, the animation in which the incomplete fingerprint is morphed into the complete fingerprint includes a plurality of frames of images, and storing these images occupies large storage space of a terminal device. For example, in the process in which the user records the fingerprint, an animation that guides the user to record the fingerprint usually needs 946 frames of images, and a size of each frame of image is 35 KB. In this case, an entire prompt file needs to occupy approximately 33 MB memory in total.

SUMMARY

Embodiments of this application provide an electronic device, a method for prompting function setting of the electronic device, a method for playing a prompt file, and a medium.

According to a first aspect, an embodiment of this application provides a method for prompting function setting, where the method is applied to an electronic device and includes:
the electronic device displays a first sequence frame image of a prompt file in response to a first operation performed by a user; and
the electronic device displays a second sequence frame image of the prompt file in response to a second operation performed by the user, where
the prompt file includes at least first-part contour information and second-part contour information of a playing object, the second sequence frame image is generated based on the second-part contour information of the playing object, the first sequence frame image is generated based on the first-part contour information of the playing object, and the second sequence frame image includes content of the first sequence frame image.

It can be understood that the electronic device may be a terminal device, and the second-part contour information may be contour information of a complete or relatively complete playing object in a base image. The second sequence frame image includes the complete or relatively complete playing object in the base image. The second-part contour information may be contour information of a part of the playing object. In this way, a complete or partial display effect of the playing object can be restored by using the contour information, so that occupied memory space for storing the fingerprint prompt file in the electronic device that plays the fingerprint prompt file is reduced.

In a possible implementation of the first aspect, the prompt file further includes first image information and second image information, the first image information includes the playing object and a background of the playing object, and the second image information includes the background of the playing object.

It can be understood that the first image information may be base image information including a complete playing object, and the second image information may be a blank background image without any other object image or background image information including the playing object in the base image or including another image. For example, if a background of a fingerprint is white, a background image may be a pure white image without any other object, or may be an image including a light-color fingerprint. For example, a hollow area is set on the background image, and the background image in which the hollow area is set covers the base image, to obtain non-base images having partial fingerprints. In this way, the complete or partial display effect of the playing object can be restored by using only the contour information, the base image, and the background image of the playing object, so that the occupied memory space for storing the fingerprint prompt file in the electronic device that plays the fingerprint prompt file is reduced.

In a possible implementation of the first aspect, the playing object is a fingerprint.

It can be understood that in a process in which a user records a fingerprint by using a fingerprint recording function, when the user presses a screen and releases a finger, an animation in which an incomplete fingerprint is morphed into a complete fingerprint may be played, to guide the user to enter the complete fingerprint. The animation in which the incomplete fingerprint is morphed into the complete fingerprint includes a plurality of frames of images. In this embodiment of this application, the complete or partial display effect of the playing object can be restored by using the contour information of the playing object, so that the occupied space for storing the fingerprint prompt file in the electronic device that plays the fingerprint prompt file is reduced.

In a possible implementation of the first aspect, the first image information includes a complete fingerprint having a first color, and the second image information further includes a complete fingerprint having a second color.

In a possible implementation of the first aspect, a first displayed sequence frame image is generated based on the second image information, and a last displayed sequence frame image is generated based on the first image information.

It can be understood that the $1^{st}$ sequence frame image may be a background image that displays a light-color complete fingerprint, and the last sequence frame image may be a purple complete fingerprint.

In a possible implementation of the first aspect, the contour information includes coordinate values of a contour of a first part or a second part of the playing object.

It can be understood that the coordinate values may be pixel coordinate values, or may be image coordinate values converted from pixel coordinate values.

In a possible implementation of the first aspect, a carrier of the at least first-part contour information and second-part contour information of the playing object is a JSON file.

According to a second aspect, an embodiment of this application provides a method for playing a prompt file, where the method is applied to an electronic device and includes:

the electronic device generates at least a first sequence frame image and a second sequence frame image in response to an operation performed by a user for playing the prompt file; and the electronic device plays the first sequence frame image and the second sequence frame image in a predetermined order, where the prompt file includes at least first-part contour information and second-part contour information of a playing object, the second sequence frame image is generated based on the second-part contour information of the playing object, the first sequence frame image is generated based on the first-part contour information of the playing object, and the second sequence frame image includes content of the first sequence frame image.

In a possible implementation of the second aspect, the prompt file further includes first image information and second image information, the first image information includes the playing object and a background of the playing object, and the second image information includes the background of the playing object.

In a possible implementation of the second aspect, the playing object is a fingerprint.

In a possible implementation of the second aspect, the first image information includes a complete fingerprint having a first color, and the second image information further includes a complete fingerprint having a second color.

In a possible implementation of the second aspect, a first displayed sequence frame image is generated based on the second image information, and a last displayed sequence frame image is generated based on the first image information.

In a possible implementation of the second aspect, the contour information includes coordinate values of a contour of a first part or a second part of the playing object.

In a possible implementation of the second aspect, the prompt file further includes playing duration of each of the first sequence frame image and the second sequence frame image.

It can be understood that the prompt file may further include a playing manner of each frame of image in an animation, for example, playing duration.

In a possible implementation of the second aspect, during playing of each of the first sequence frame image and the second sequence frame image, the playing is performed based on the playing duration corresponding to the image.

In a possible implementation of the second aspect, a carrier of the at least first-part contour information and second-part contour information of the playing object is a JSON file.

According to a third aspect, an embodiment of this application provides an electronic device, including:
 a memory, configured to store instructions executed by one or more processors of the electronic device; and
 a processor, which is one of processors of the electronic device and is configured to perform a method for prompting function setting, where the method includes:
 the electronic device displays a first sequence frame image of a prompt file in response to a first operation performed by a user; and
 the electronic device displays a second sequence frame image of the prompt file in response to a second operation performed by the user, where
 the prompt file includes at least first-part contour information and second-part contour information of a playing object, the second sequence frame image is generated based on the second-part contour information of the playing object, the first sequence frame image is generated based on the first-part contour information of the playing object, and the second sequence frame image includes content of the first sequence frame image.

In a possible implementation of the third aspect, the prompt file further includes first image information and second image information, the first image information includes the playing object and a background of the playing object, and the second image information includes the background of the playing object.

In a possible implementation of the third aspect, the playing object is a fingerprint.

In a possible implementation of the third aspect, the first image information includes a complete fingerprint having a first color, and the second image information further includes a complete fingerprint having a second color.

In a possible implementation of the third aspect, a first displayed sequence frame image is generated based on the second image information, and a last displayed sequence frame image is generated based on the first image information.

In a possible implementation of the third aspect, the contour information includes coordinate values of a contour of a first part or a second part of the playing object.

In a possible implementation of the third aspect, a carrier of the at least first-part contour information and second-part contour information of the playing object is a JSON file.

According to a fourth aspect, an embodiment of this application provides an electronic device, including:
 a memory, configured to store instructions executed by one or more processors of the electronic device; and
 a processor, which is one of processors of the electronic device and is configured to perform a method for playing a prompt file, where the method includes:
 the electronic device generates at least a first sequence frame image and a second sequence frame image in response to an operation performed by a user for playing the prompt file; and
 the electronic device plays the first sequence frame image and the second sequence frame image in a predetermined order, where
 the prompt file includes at least first-part contour information and second-part contour information of a playing object, the second sequence frame image is generated based on the second-part contour information of the playing object, the first sequence frame image is generated based on the first-part contour information of the playing object, and the second sequence frame image includes content of the first sequence frame image.

In a possible implementation of the fourth aspect, the prompt file further includes first image information and second image information, the first image information includes the playing object and a background of the playing object, and the second image information includes the background of the playing object.

In a possible implementation of the fourth aspect, the playing object is a fingerprint.

In a possible implementation of the fourth aspect, the first image information includes a complete fingerprint having a first color, and the second image information further includes a complete fingerprint having a second color.

In a possible implementation of the fourth aspect, a first displayed sequence frame image is generated based on the second image information, and a last displayed sequence frame image is generated based on the first image information.

In a possible implementation of the fourth aspect, the contour information includes coordinate values of a contour of a first part or a second part of the playing object.

In a possible implementation of the fourth aspect, the prompt file further includes playing duration of each of the first sequence frame image and the second sequence frame image.

In a possible implementation of the fourth aspect, during playing of each of the first sequence frame image and the second sequence frame image, the playing is performed based on the playing duration corresponding to the image.

In a possible implementation of the fourth aspect, a carrier of the at least first-part contour information and second-part contour information of the playing object is a JSON file.

According to a fifth aspect, an embodiment of this application provides a readable medium, where the readable medium stores instructions, and when the instructions are executed on an electronic device, a machine is enabled to perform the method for prompting function setting according to any one of the first aspect or the possible implementations of the first aspect, or the method for producing a prompt file according to any one of the second aspect or the possible implementations of the second aspect.

DETAILED DESCRIPTION OF ILLUSTRATIVE EMBODIMENTS

Illustrative embodiments of this application include but are not limited to an electronic device, a method for prompting function setting of the electronic device, a method for playing a prompt file, and a medium.

For ease of understanding, some terms used in embodiments of this application are first described.

A playing object is an object to be presented by a prompt file to a user. For example, for a fingerprint animation presented to the user in a fingerprint collection process, the playing object is a fingerprint.

Figure 1:
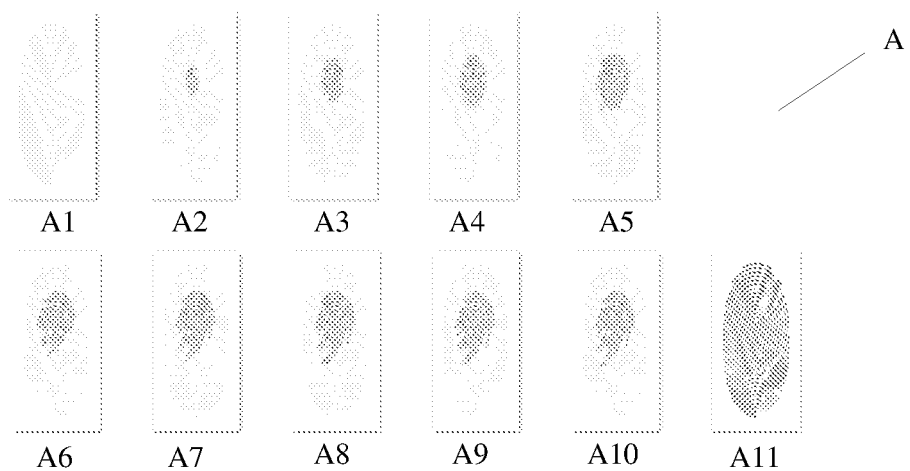
FIG. 1 is a schematic diagram of a fingerprint image sequence according to an embodiment of this application.

A base image is an image including a complete or relatively complete playing object, for example, an image including a complete fingerprint. FIG. 1 is a schematic diagram of a fingerprint image sequence according to an embodiment of this application. The base image is an image A11 in an image sequence A shown in FIG. 1.

The background image is a blank background image without any other object image or a background image including a playing object in a base image or including another image. For example, if a background of a fingerprint is white, the background image may be a pure white image without any other object, or may be an image including a light-color fingerprint, as shown in an image sequence A1 in FIG. 1.

Fingerprint animation: When a user records a fingerprint on an electronic device, the fingerprint animation presents a process of performing gradual filling to obtain a complete fingerprint to the user. In a process of playing the fingerprint animation, a sequence of played images is shown in FIG. 1.

As described above, when the user is guided to operate some functions of the electronic device, a related operation guide may be presented to the user by playing the animation. However, playing the animation or storing the prompt file occupies storage resources of the electronic device. To resolve this problem, this application provides a method for producing a prompt file. The prompt file produced by using the method does not include all image information data in an image sequence needed to play an animation, that is, does not include all images in the image sequence A shown in FIG. 1, but includes only image information including a complete playing object (namely, base image information, for example, image information including a complete fingerprint for a fingerprint animation, as denoted by the image A11 in FIG. 1), image information including a background of the complete playing object (namely, background image information, for example, background image information including a complete fingerprint whose color is weakened for the fingerprint animation, as denoted by the image A1 in FIG. 1), and a drive file. The drive file includes contour information of an incomplete playing object in an image that is in the image sequence and that presents the incomplete playing object. The drive file may further include a display manner of the presented image (for example, display duration of the generated image including the incomplete playing object).

Figure 2:
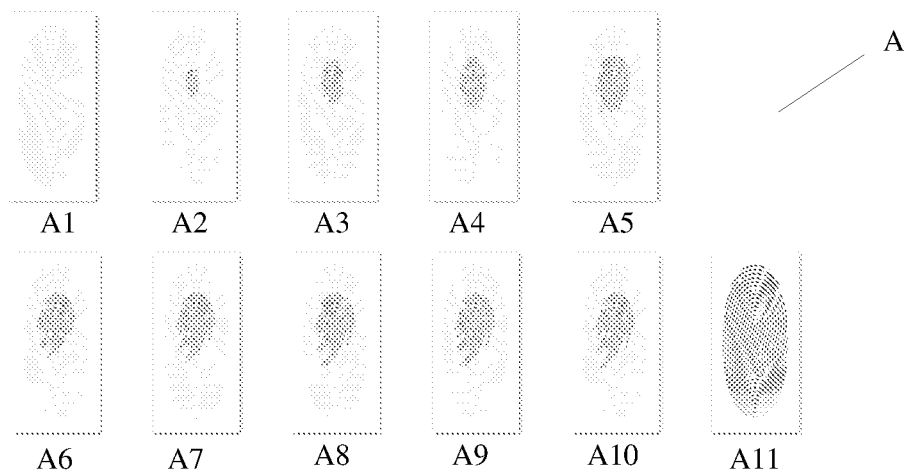
FIG. 2 is a schematic diagram of a contour of an incomplete fingerprint playing object of an image A5 in FIG. 1 according to an embodiment of this application.

For example, FIG. 2 shows a contour of an incomplete fingerprint denoted by an image A5 in FIG. 1. The contour information may include edge coordinates of a plurality of incomplete playing objects. In other words, the prompt file stores only area contour information of the incomplete playing object instead of storing all the images. This reduces storage space occupied by the prompt file.

In addition, in a process of playing the prompt file, an image of an incomplete playing object defined by each piece of contour information is gradually restored based on the contour information in the drive file by using the base image information and the background image information. In other words, during playing of the prompt file, the image sequence shown in FIG. 1 is played. For example, as shown in FIG. 1, a process in which an incomplete fingerprint is morphed into a complete fingerprint is played, as denoted by the image A1, an image A2, an image A3, an image A4, the image A5, an image A6, an image A7, an image A8, an image A9, an image A10, and the image A11 shown in FIG. 1. For example, in a process of playing the fingerprint animation, when an image including an incomplete playing object needs to be played, a hollow area and a non-hollow area of a background image may be set based on the contour information in the drive file. The hollow area is used to expose a partial playing object, namely, the incomplete playing object. Then, the background image information corresponding to the hollow area that has been set is correspondingly superimposed on the base image information, to display the incomplete fingerprint playing object defined by the hollow area that is based on the contour information. In this way, in comparison with a technical solution for storing storage information of each frame of image in an image sequence, at least memory occupied by image information in the image sequence other than the base image information and the background image information can be omitted in this embodiment of this application.

The following further details the technical solutions in embodiments of this application with reference to the accompanying drawings and embodiments. For ease of description, the following provides descriptions by using an example in which the prompt file is a fingerprint prompt file.

Figure 3:
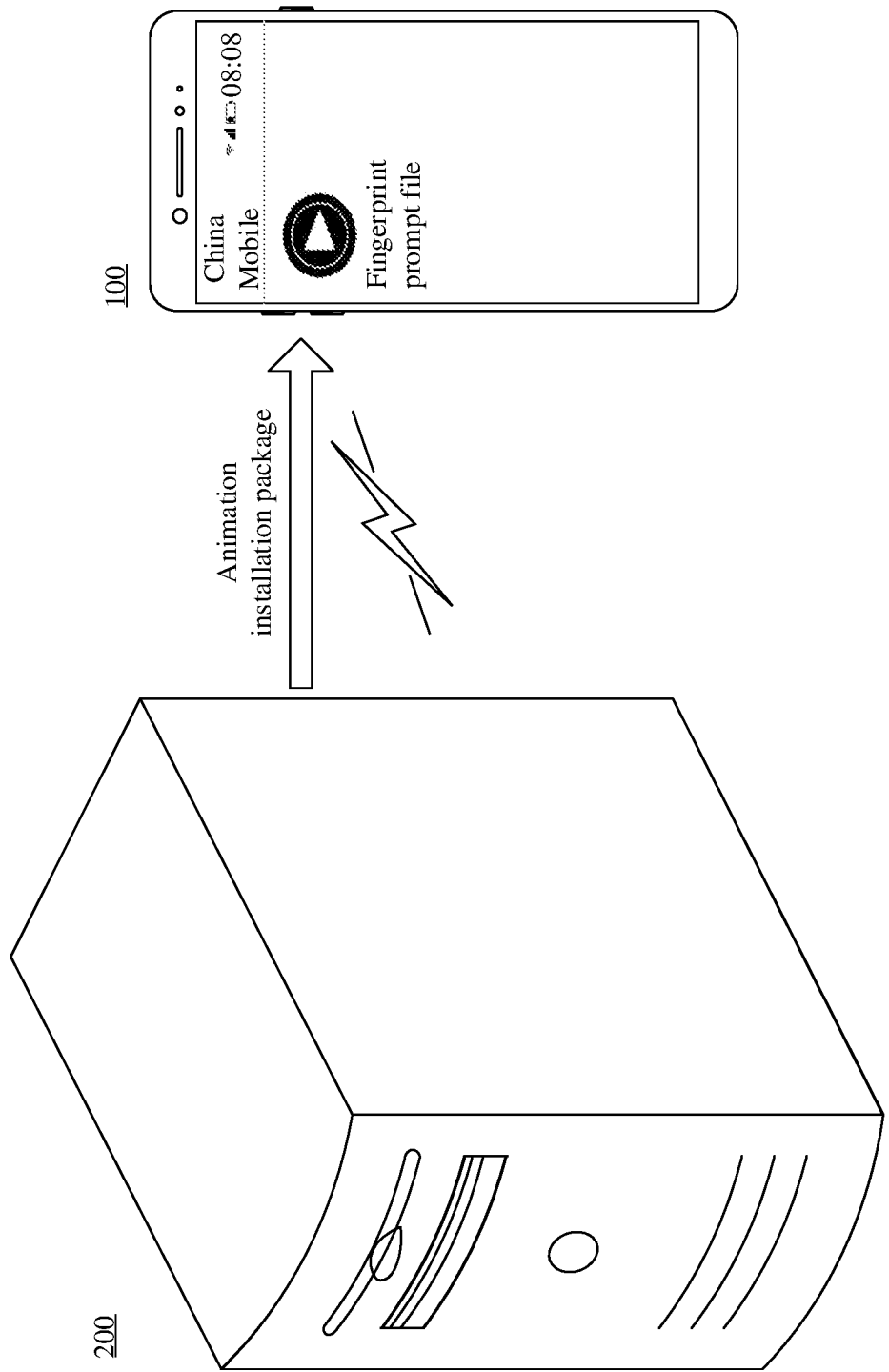
FIG. 3 is a schematic diagram of an application scenario of producing and playing a fingerprint prompt file according to some embodiments of this application.

FIG. 3 is a schematic diagram of an application scenario of producing and playing a fingerprint prompt file according to some embodiments of this application.

As shown in FIG. 3, in this application scenario, a first electronic device 100 is configured to play an animation that guides a user to record a fingerprint, and a second electronic device 200 is configured to produce a fingerprint prompt file to be played by the first electronic device 100.

Specifically, the second electronic device 200 may produce, based on an image sequence presented during playing of the fingerprint prompt file, the fingerprint prompt file that includes base image information, background image information, contour information, and a drive file, and then send an animation installation package corresponding to the produced fingerprint prompt file to the first electronic device 100. After receiving the installation package corresponding to the fingerprint prompt file sent by the second electronic device 200, the first electronic device 100 loads the animation installation package corresponding to the fingerprint prompt file on the first electronic device 100. When the user uses a related function, the first electronic device 100 plays the fingerprint prompt file in the installation package for the user. In addition, it can be understood that the animation installation package may be alternatively a part of a setting program installation package of the first electronic device 100, but is not limited thereto.

It can be understood that the first electronic device 100 applicable to this application may be various devices that have a function of playing a fingerprint prompt file, for example, a mobile phone, a computer, a laptop computer, a tablet computer, a television set, a display device, an outdoor display screen, or a vehicle terminal. The second electronic device 200 applicable to this application may be various devices for producing a fingerprint prompt file. For example, the second electronic device 200 may be a server, and the server may be a hardware server or may be embedded in a virtualized environment. For example, according to some embodiments of this application, the server 200 may be a virtual machine executed on a hardware server including one or more other virtual machines, namely, a cloud server. The electronic device 100 may perform wireless communication with the server 200 in various wireless manners.

For ease of description, the following uses an example in which the first electronic device 100 is a mobile phone 100 and the second electronic device 200 is a server 200 for description.

Figure 4A:
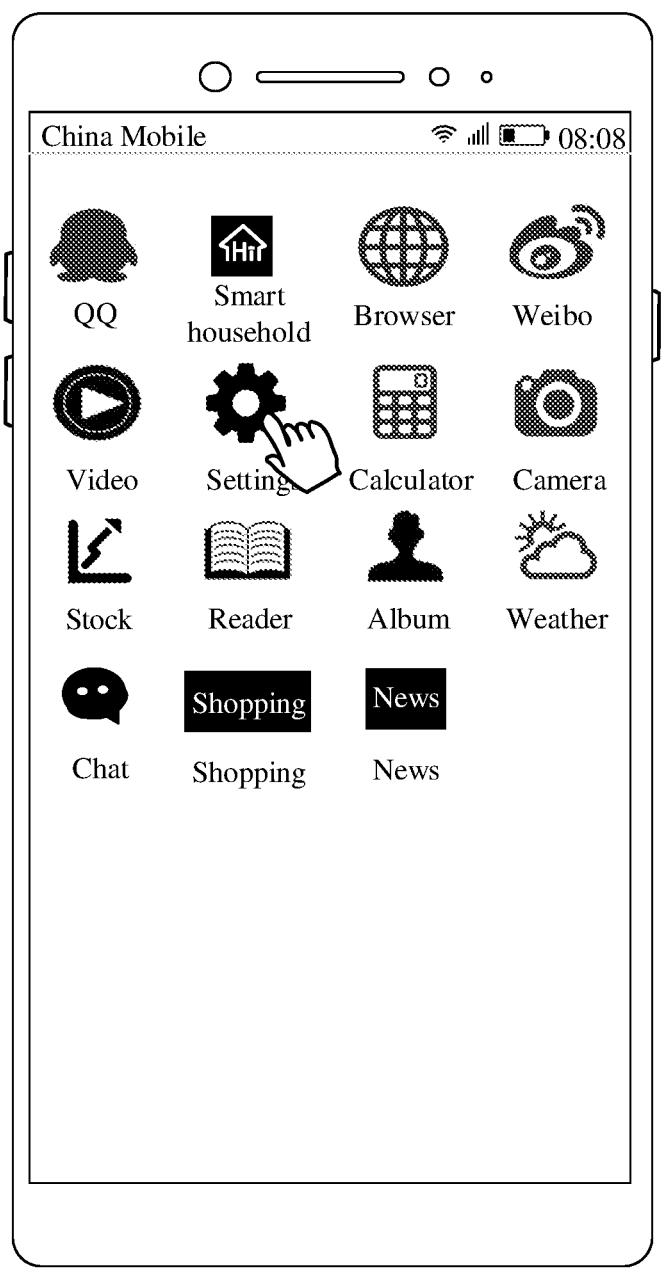
FIG. 4A is a schematic diagram of an operation interface for playing a fingerprint animation by a user on a mobile phone 100.
Figure 4B:
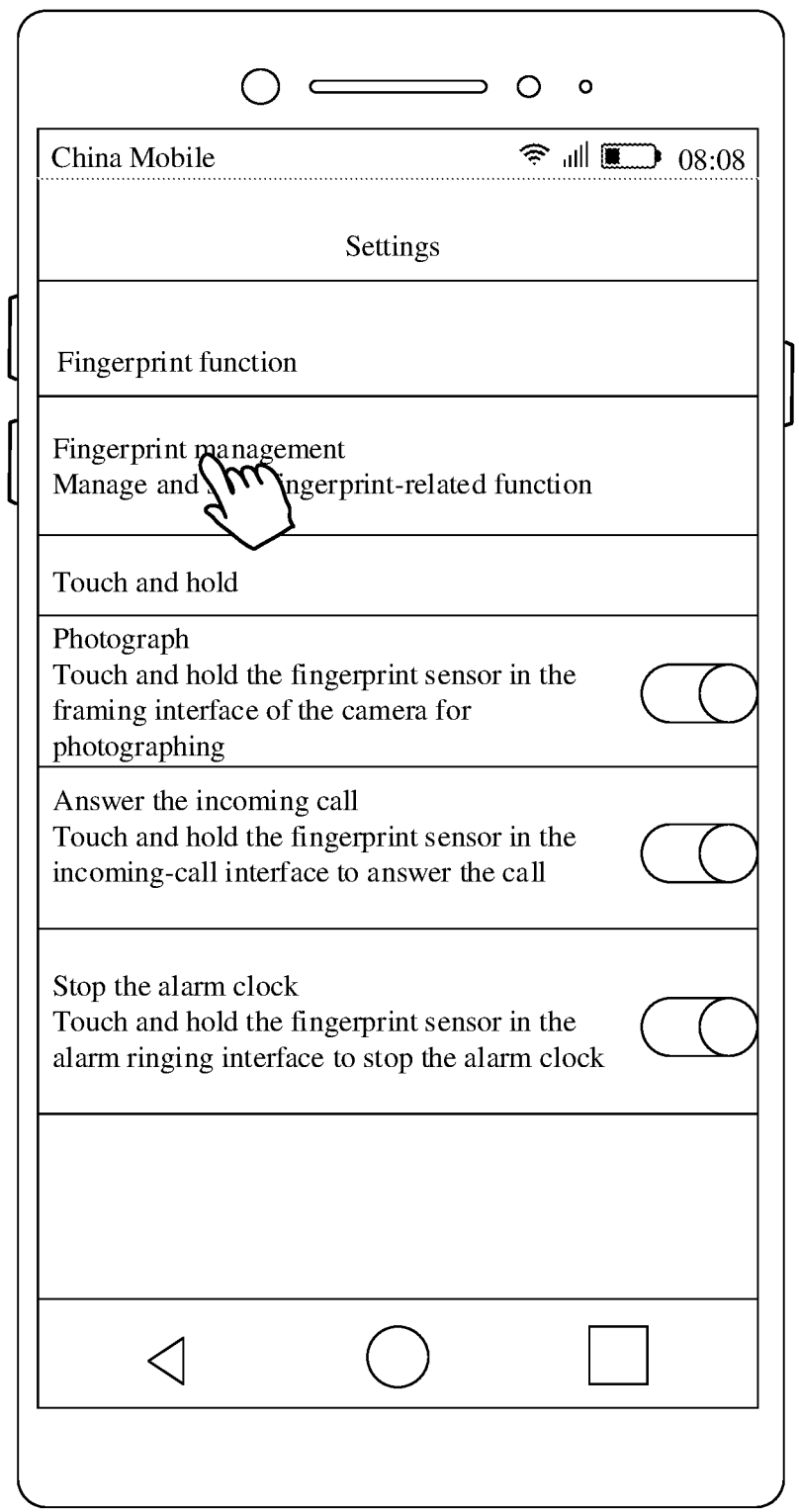
FIG. 4B is a schematic diagram of an operation interface for playing a fingerprint animation by a user on a mobile phone 100.
Figure 4C:
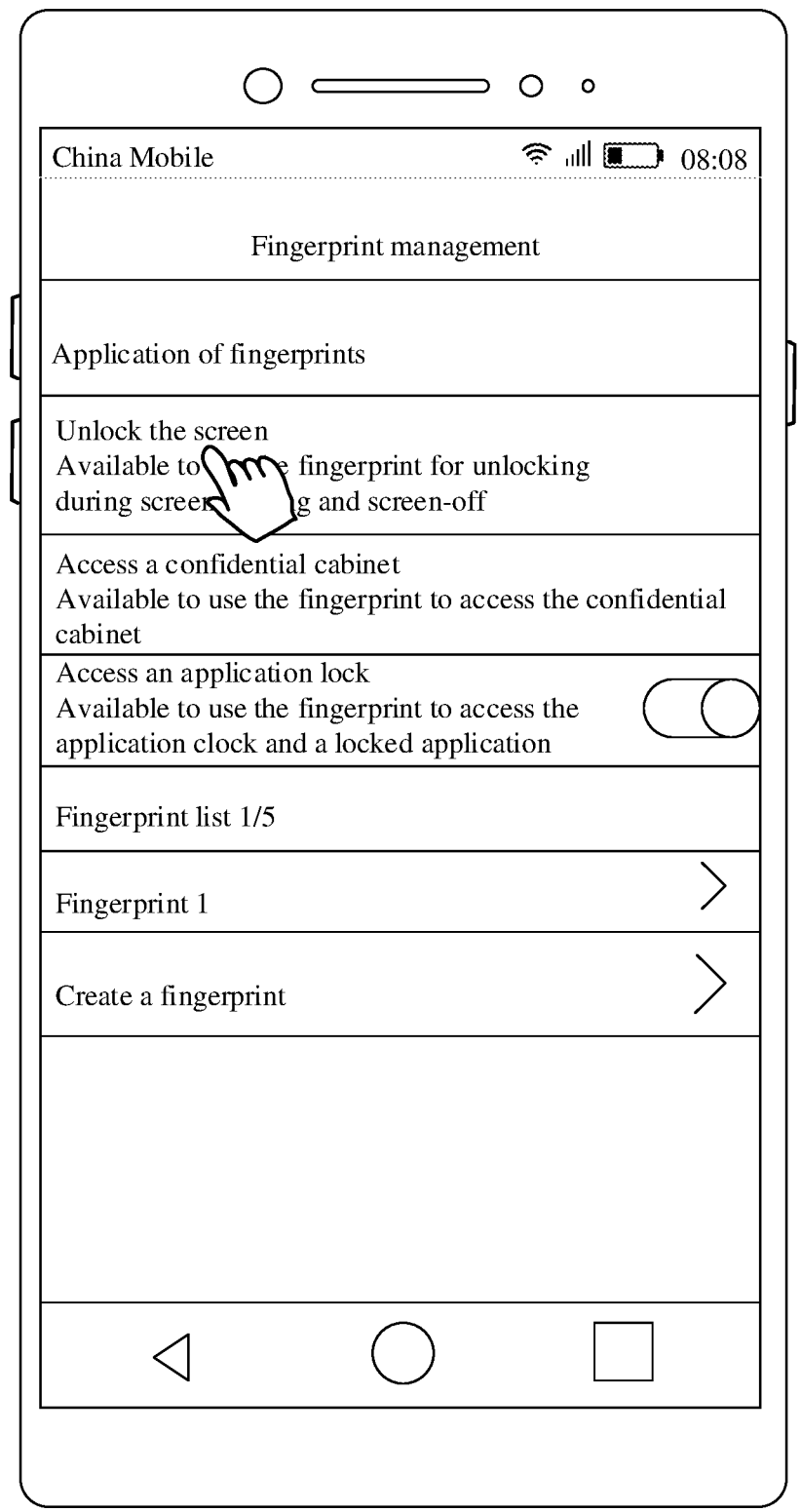
FIG. 4C is a schematic diagram of an operation interface for playing a fingerprint animation by a user on a mobile phone 100.
Figure 4D:
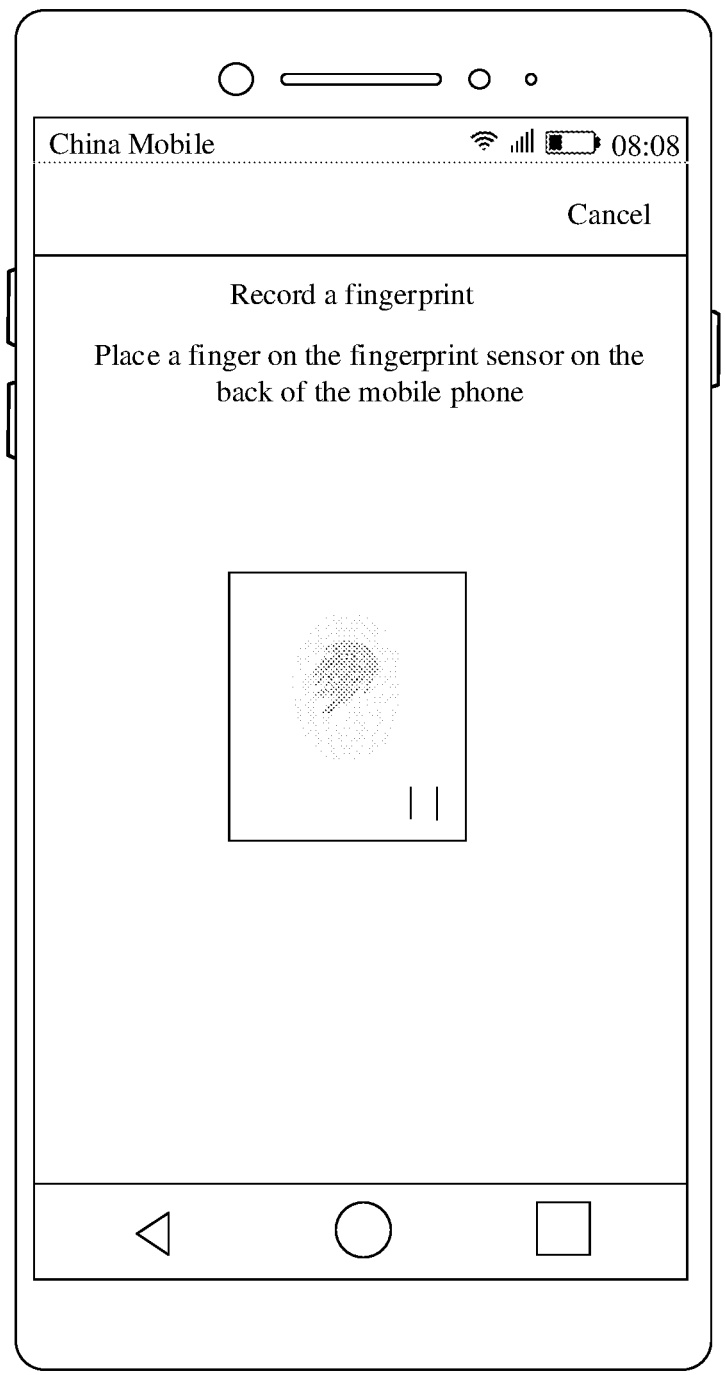
FIG. 4D is a schematic diagram of an operation interface for playing a fingerprint animation by a user on a mobile phone 100.

FIG. 4A to FIG. 4D are schematic diagrams of a change process of operation interfaces for playing a fingerprint animation by a user on a mobile phone 100. As shown in FIG. 4A, assuming that the user needs to record a fingerprint on the mobile phone 100, the user needs to tap an icon control "Settings". Then, as shown in FIG. 4B, the mobile phone 100 displays a setting interface. The user taps fingerprint management on the setting interface to enter a fingerprint management interface, as shown in FIG. 4C. The user taps an icon control "Unlock screen" on the fingerprint management interface to display a fingerprint recording interface. As shown in FIG. 4D, when the mobile phone 100 displays the fingerprint recording interface, the mobile phone 100 automatically plays a fingerprint prompt file. The fingerprint prompt file is used to play a process in which an incomplete fingerprint is morphed into a complete fingerprint, to indicate the user to record complete fingerprint information in a fingerprint recording process, thereby improving user experience of using a fingerprint recording function of the first device 100.

In another application scenario, in a process in which the user uses the fingerprint recording function of the mobile phone 100, when the user performs a fingerprint pressing operation in a fingerprint collection area, the mobile phone 100 responds to the fingerprint pressing operation performed in the fingerprint collection area, that is, responds to an operation performed by the user for playing the prompt file, and generates at least one frame of image in the prompt file. For example, when the user performs a fingerprint pressing operation for the first time, the mobile phone 100 collects little fingerprint information, and displays an incomplete fingerprint. When the user performs a fingerprint pressing operation for the second time, the mobile phone 100 collects more fingerprint information than the previous time, and displays a more complete fingerprint image than the previous time, to prompt the user to continue fingerprint recording, so that the mobile phone 100 collects complete or relatively complete fingerprint information.

It can be understood that, as described above, the fingerprint prompt file played herein includes base image information, background image information, and a contour information-based drive file that are in an image sequence.

Figure 5:
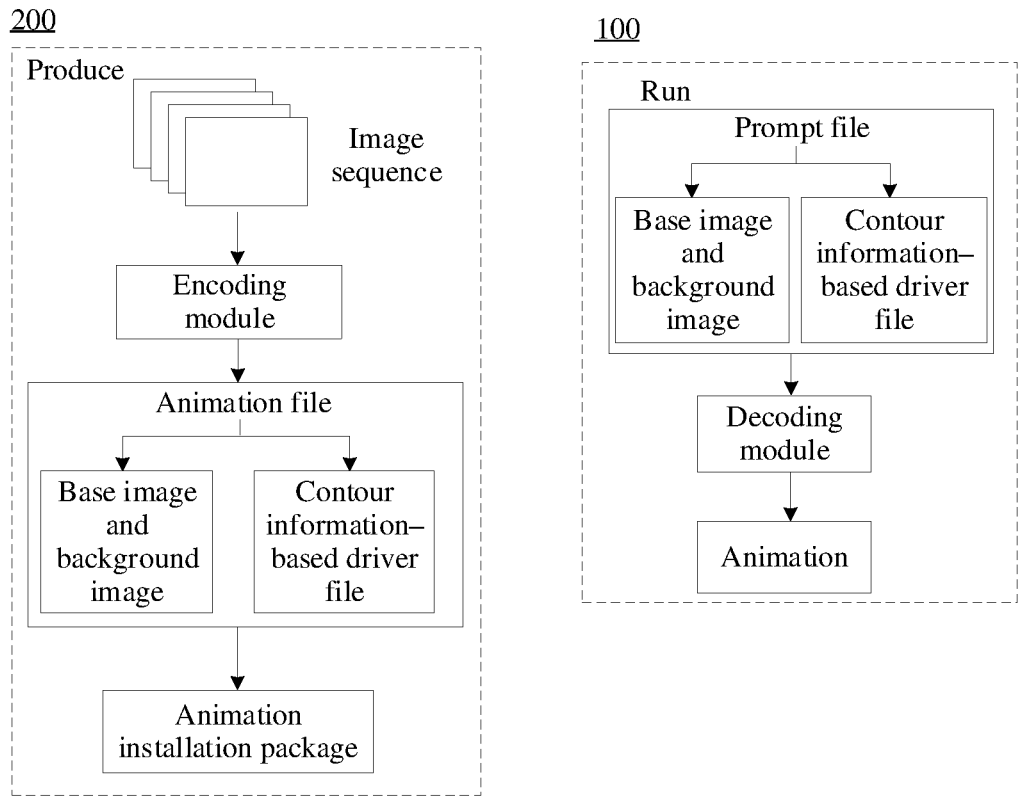
FIG. 5 shows processes of producing and playing a fingerprint prompt file according to some embodiments of this application.

FIG. 5 shows processes of producing and playing a fingerprint prompt file according to some embodiments of this application.

Specifically, as shown in FIG. 5, the process in which the server 200 produces the fingerprint prompt file includes the following steps.

A fingerprint image sequence (as shown in FIG. 1) in which image content is morphed is input into an encoding module in the server 200. The encoding module can retain base image information (as denoted by the image A11 in FIG. 1) and background image information (as denoted by the image A1 in FIG. 1), extract contour information of fingerprints in non-base images in the fingerprint image sequence other than the base image information and the background image information, generate a drive file based on the contour information of the fingerprints in the non-base images, and then generate a fingerprint prompt file that includes the base image information, the background image information, and the drive file.

Figure 6:
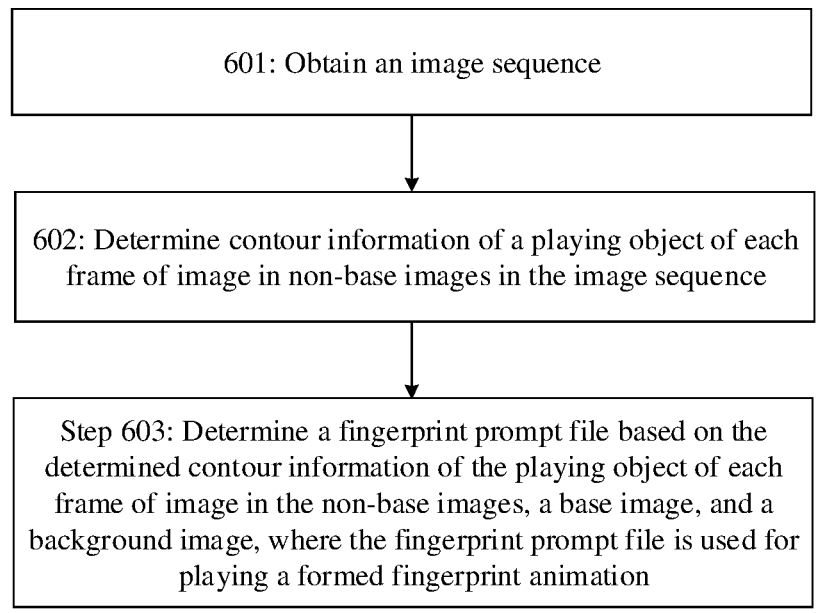
FIG. 6 is a schematic flowchart of a method for producing a fingerprint prompt file according to some embodiments of this application.

As shown in FIG. 6, a detailed process in which the encoding module produces the fingerprint prompt file includes the following steps.

Step 601: The encoding module in the server 200 obtains an image sequence.

The image sequence includes a base image and non-base images, and image information of the non-base images is partial image information in base image information.

It can be understood that the image sequence includes a plurality of frames of images, and the plurality of frames of image information is classified into the base image information and the non-base image information based on different image information of all the frames of images. The base image includes image information of a complete or relatively complete playing object, and image information of incomplete playing objects in the non-base image information is partial image information of the playing object in the base image. For example, the image A11 in FIG. 1 is the base image information, and includes a complete fingerprint; and an image A2 to an image A10 are the non-base images, and include partial fingerprints, namely, incomplete fingerprints.

Step 602: The encoding module in the server 200 determines contour information of a playing object of each frame of image in the non-base images in the image sequence.

The contour information is determined based on an edge of a partial playing object of each frame of image in the non-base images, and the contour information is used to define the partial playing object displayed in each frame of generated image in an animation. For example, playing objects displayed in all frames of images in a fingerprint animation may be in a one-to-one correspondence with playing objects of all the frames of images in the image sequence in FIG. 1, that is, display effects of all the frames of images in the fingerprint animation may be respectively the same as display effects of all the frames of images in the image sequence in FIG. 1.

It can be understood that in the image sequence in which image information is morphed, at least partially same image information exists between all the frames of images. To reduce occupied storage space, the image information including the complete fingerprint may be used as the base image information in a process of playing the fingerprint prompt file, and the contour information of the partial playing object of each frame of image in the non-base images is extracted. The contour information is used to define display content of each frame of image in a process of playing the fingerprint animation. As shown in FIG. 2, the image A5 includes a fingerprint playing object B, and contour information is extracted based on an edge of the fingerprint playing object B to obtain edge coordinate data. The edge coordinate data is used to form an edge contour C during subsequent playing of the fingerprint animation, to define and display image information B within the edge contour C. The contour information of the fingerprint images A2 to A11 in the image sequence A in FIG. 1 is separately extracted, to obtain edge image coordinate values of a fingerprint in each frame of image. To be specific, a range of each frame of changed content is obtained based on an original input image sequence, and the range of the changed content is described by using a series of points. For example, as shown in FIG. 1, a fingerprint playing object in the image A2 is small, and a range of the fingerprint playing object may be described by using a curve formed by 10 coordinate points. Coordinate values are [{"x": 294, "y": 292}, {"x": 302, "y": 293}, {"x": 309, "y": 298}, {"x": 309, "y": 304}, {"x": 303, "y": 306}, {"x": 297, "y": 304}, {"x": 293, "y": 306}, {"x": 283, "y": 308}, {"x": 285, "y": 300}, and {"x": 290, "y": 294}]. x represents a numerical variable in a coordinate axis in a first direction of the image. Data following x represents a location in the coordinate axis in the first direction and may be measured in millimeters, but is not limited thereto. y represents a numerical variable in a coordinate axis in a second direction of the image. Data following y represents a location in the coordinate axis in the second direction and may be measured in millimeters, but is not limited thereto.

In some embodiments, the series of coordinate values may be obtained in a manual intervention manner. For example, the edge of the fingerprint playing object B is manually circled by using a closed fingerprint contour marking line, and then the server 200 performs sampling on the marking line to obtain a plurality of groups of coordinate values (x, y). A sampling density is set depending on a scenario, for example, one point is determined at an interval of 0.5 millimeter. Details are as follows:

Contour lines are drawn for the partial playing objects in the non-base images in the image sequence, where colors of the contour lines are colors that can be distinguished from colors of the playing objects. For example, the colors of the contour lines are different from the colors of the playing objects. Various fingerprints in the non-base images are purple, and the contour lines are blue.

The non-base images with the contour lines marked are recorded into the server 200. The server 200 receives the non-base images with the contour lines marked, scans the non-base images with the contour lines marked, and extracts the contour information of the partial playing objects in the non-base images. A specific scanning process is as follows:

Starting from a first row of pixels of the non-base images with the contour lines marked, pixels of the non-base images with the contour lines marked are scanned row by row from left to right or from right to left. If colors of the pixels are the colors of the contour lines, for example, blue, current pixel coordinate values (x, y) are recorded, and the current pixel coordinate values are converted into image coordinate values. The pixel coordinate values are coordinate values in a pixel coordinate system, and the image coordinate values are coordinate values in an image coordinate system. Conversion of pixel coordinate values into image coordinate values is the conventional technology, and details are not described herein. The collected edge image coordinate values of the playing objects form the contour information of the playing objects.

After all scanning is completed, sampling performed on the coordinate values of the contour lines of the partial playing objects in the non-base images with the contour lines marked are completed, and edge coordinate data may be output to a JSON file, to produce a drive file used for animation playing.

In some other embodiments, if the colors of the non-base images are complex, the contour lines of the playing objects may be identified by using a mature image matting algorithm in the industry. To be specific, the server 200 automatically uses a closed fingerprint contour marking line to obtain edge image coordinate values of a partial fingerprint B1. This manner is different from the manual intervention manner in that the closed fingerprint contour marking line is calculated by using a contour detection algorithm. The contour detection uses an existing algorithm. Details are as follows:

The server 200 marks the contour lines of the playing objects in the non-base images in the image sequence by using the contour detection algorithm.

The non-base images with the contour lines marked are recorded into the server 200. The server 200 receives the non-base images with the contour lines marked, scans the non-base images with the contour lines marked, and extracts the contour information of the playing objects in the non-base images. A specific scanning process is as follows:

Starting from a first row of pixels of the non-base images with the contour lines marked, pixels of the non-base images with the contour lines marked are scanned row by row. If colors of the pixels are the colors of the contour lines, for example, blue, current pixel coordinate values (x, y) are recorded, and the current pixel coordinate values are converted into image coordinate values. The collected edge image coordinate values of the playing objects form the contour information of the playing objects.

After all scanning is completed, sampling performed on the coordinate values of the contour lines in the non-base images with the contour lines marked are completed, and edge coordinate data may be output to a JSON file, to produce a drive file used for animation playing. In some embodiments, to reduce a workload of reading the edge coordinate data when the mobile phone 100 plays the prompt file, and to meet a requirement of determining the playing objects accurately, inter-row filtering is performed after scanning of each row is completed, and pixel coordinate values of a row that are quite close to each other are filtered out based on a preset step. To be specific, whether a distance between current image coordinate values and previous image coordinate values exceeds the preset step is determined, and points between which a distance is less than the preset step are deleted. This reduces an amount of edge coordinate data.

Step 603: The encoding module in the server 200 determines the fingerprint prompt file based on the determined contour information of the playing object of each frame of image in the non-base images, the base image, and the background image.

Because display content of each frame of image in the fingerprint animation is different from that of other frames of images in the fingerprint animation, the drive file in the fingerprint animation is edited based on the contour information. The fingerprint prompt file may be a fingerprint animation program file, and the fingerprint animation program file is used to guide display content and a display manner (for example, display duration) of each frame of image in the fingerprint animation.

The fingerprint prompt file includes at least the base image information, the background image information, and the drive file that is based on the contour information of the partial playing object of each frame of image in the non-base images. For example, the contour information of the fingerprint images A2 to A10 in the image sequence A in FIG. 1 is separately extracted, to obtain edge coordinate data of the fingerprint in each frame of image. A result obtained after encoding is performed based on the edge coordinate data of the base image A11 and the fingerprint images A1 to A10 includes the fingerprint prompt file that includes the base image A11, the background image A11, and the drive file that is based on the contour information of the fingerprint in each frame of image in the non-base image information.

The drive file used for animation playing may be described in a JSON file form. The following describes a JSON format by using an example:

```
{"path":[
  [ ], //path1
       [ ], //path2
  ...
  [ ], //path10
],//path11
]
"frame_info":[
  [ ], //attribute of a first frame
  ...
  [ ], //attribute of an eleventh frame
]
}
[
```

Content in [ ] is coordinate values similar to [{"x": 294, "y": 292}, {"x": 302, "y": 293}, {"x": 309, "y": 298}, {"x": 309, "y": 304}, {"x": 303, "y": 306}, {"x": 297, "y": 304}, {"x": 293, "y": 306}, {"x": 283, "y": 308}, {"x": 285, "y": 300}, and {"x": 290, "y": 294}], path1 represents first frame image information (for example, A2 in FIG. 1), information after a colon of the path1 represents contour information of second frame image information (for example, edge coordinate data of the image A2 in FIG. 1), and meanings of path2 to path10 are similar to those of the path1. Details are not described herein again. At the end of the JSON, content in the frame_info field indicates a display effect attribute of each frame of image. For example, "frame_info":[{"duration": 37} indicates that playing duration of the generated first frame of image is 37 milliseconds.

It can be understood that in some other embodiments, more effect attribute parameters of an animation playing program file may be extended based on a use service scenario. For example, each frame of image is displayed in a gradient manner or a flying manner, but is not limited thereto. The server 200 uses one frame of base image information, one frame of background image information, and one JSON file as a source file, and packages the source file into a fingerprint animation installation package (as an example of the fingerprint prompt file). In some other embodiments, the fingerprint animation installation package may be a setting application installation package. In this way, in the process of playing the fingerprint animation, the fingerprint animation installation package can be reversely decoded to achieve a playing effect of morphing image information content. The fingerprint animation installation package may be an Android application package (APK). The Android application package is an application package file format used by an Android operating system to distribute and install a mobile application and a middleware. To run code of an Android application on an Android device, the code needs to be compiled first, and then packaged into a file that can be identified by an Android system. The file format that can be identified and run by the Android system is an "APK". An APK file includes a compiled code file (.dex file), file resources (resources), native resource files (assets), certificates, and a manifest file.

The encoding module in the server 200 obtains the fingerprint animation installation package after producing and packaging the fingerprint prompt file, and then may implant the fingerprint animation installation package into the mobile phone 100. The mobile phone 100 obtains the fingerprint animation installation package from the server 200, decompresses the fingerprint animation installation package, and installs the fingerprint animation installation package in the mobile phone 100.

It can be understood that the server 200 and the mobile phone 100 may exchange data by using a wired link connection or a wireless link connection, to install the animation installation package in the first electronic device 100.

Still with reference to FIG. 5, after the animation installation package is installed, the mobile phone 100 may play the fingerprint prompt file when a user records a fingerprint.

Specifically, the mobile phone 100 runs, by using a decoding module, the drive file in the fingerprint prompt file, for example, the JSON file used for playing the fingerprint playing object animation. During playing of the prompt file, a change process of a display part of the playing object defined by each piece of contour information is gradually restored, for example, a process in which an incomplete playing object is morphed into a complete playing object.

Figure 7:
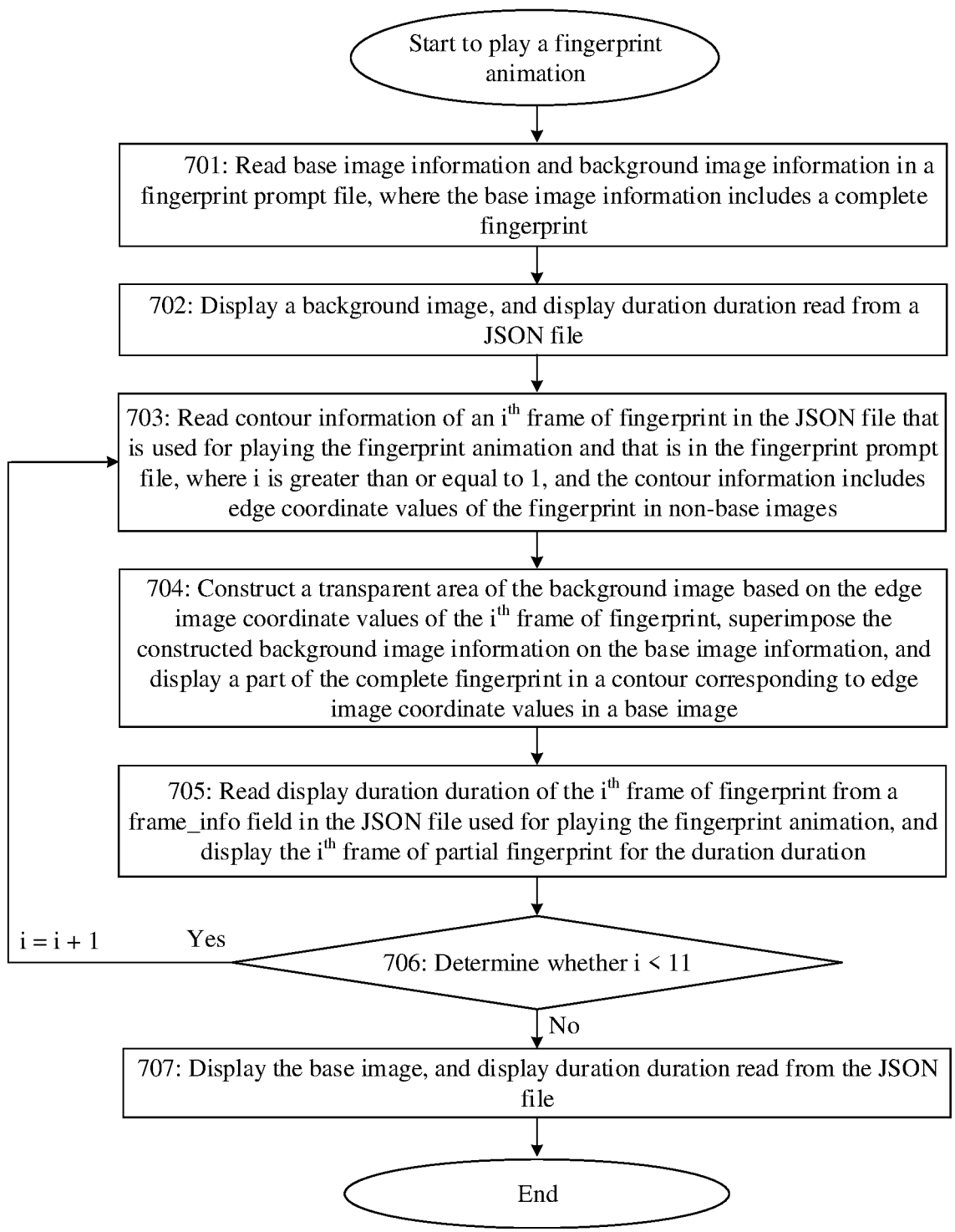
FIG. 7 is a schematic diagram of a playing procedure for achieving a playing effect of a fingerprint image sequence A in FIG. 1 according to some embodiments of this application.

Specifically, that the playing object is a fingerprint is used for as an example for description. FIG. 7 is a schematic diagram of a playing procedure for achieving a playing effect of a fingerprint image sequence A in FIG. 1 according to some embodiments of this application. As shown in FIG. 7, the method includes the following steps.

Step 701: The decoding module in the mobile phone 100 reads the base image information and the background image information in the fingerprint prompt file, where the base image information includes a complete fingerprint.

To be specific, the base image information and the background image information in the fingerprint prompt file are obtained through decoding, and are used as basic materials for subsequently playing the fingerprint animation.

Step 702: The mobile phone 100 displays the background image, and displays duration read from the JSON file.

The mobile phone 100 displays the background image based on the read background image information.

Step 703: The decoding module in the mobile phone 100 reads contour information of an ith frame of fingerprint in the JSON file that is used for playing the fingerprint animation and that is in the fingerprint prompt file, where i is greater than or equal to 1, and the contour information of the fingerprint includes edge image coordinate values of the fingerprint in the non-base images.

Step 704: The decoding module in the mobile phone 100 constructs a transparent area of the background image information based on the edge image coordinate values of the ith frame of fingerprint, superimposes the constructed background image information on the base image information, and displays a part of the complete fingerprint in a contour corresponding to edge image coordinate values of the base image information.

In some embodiments, the playing object in the base image information defined by the edge image coordinate values is displayed in a layer superimposition manner. Specifically, the manner includes: setting the background image information as a transparent area based on the contour information of the $i^{th}$ frame of fingerprint. The transparent area may also be referred to as a hollow area. The transparent area can display the playing object corresponding to the edge image coordinate values, to present the playing object, for example, the fingerprint, to the user.

For example, as shown in FIG. 1, the image A11 is set as the base image, and the image A1 including the light-color fingerprint is set as the background image. A range of the middle hollow area is a display range in a closed-loop curve circled by the edge image coordinate values of the fingerprint. For example, based on the following edge image information coordinate values of the first frame of fingerprint image information A2 and a contour of a display part of a fingerprint playing object that is circled by using a curve fitting algorithm, edge image information coordinate values of the first frame of fingerprint image A1 are as follows: [{"x": 294, "y": 292}, {"x": 302, "y": 293}, {"x": 309, "y": 298}, {"x": 309, "y": 304}, {"x": 303, "y": 306}, {"x": 297, "y": 304}, {"x": 293, "y": 306}, {"x": 283, "y": 308}, {"x": 285, "y": 300}, and {"x": 290, "y": 294}]. x represents a numerical variable in a first coordinate axis in a first direction of the image. Data following x represents a location in the first coordinate axis and may be measured in milliseconds, but is not limited thereto. y represents a numerical variable in a second coordinate axis in a second direction of the image, and data following y represents a location in the first coordinate axis and may be measured in millimeters, but is not limited thereto.

In some embodiments, data points and control points are properly set according to a Bezier curve principle, and the coordinate values are converted into the contour lines of the playing objects. The data points are used to determine start locations and end locations of the contour lines of the playing objects, and the control points are used to determine bending degrees of the contour lines of the playing objects.

The following describes an implementation process of step 703 by using an example.

(1) The mobile phone 100 draws a hollow area of the background image information. There is an existing interface on Android, so that the hollow area of the background image information can be drawn and the image information can be superimposed. Pseudo code is as follows:

Bitmap layerB=new Bitmap(Corlor.GRAY); //create a bitmap object, gray
Canvas canvas=new Canvas(mask); //prepare the canvas on the bitmap
Paint paint=new Paint( );
paint.setAlpha( ); //set transparency
canvas.drawPath(path, paint); //for details about drawing the path, refer to the point 1, and an attribute of the paint makes the area transparent.

(2) The mobile phone 100 loads the base image information:

Bitmap layerA=new Bitmap( );//load a layer A (3) The mobile phone 100 superimposes two layers, that is, the background image information with the hollow area drawn that is obtained in step (1) and the base image information, to obtain a result "result":

Bitmap result=new Bitmap( ); //a result layer obtained through composition
Canvas canvas=new Canvas(result); //canvas for layer composition
mCanvas.drawBitmap(layerA); //draw A to the canvas
mCanvas.drawBitmap(layerB); //superimpose the layer B In addition, in some other embodiments, the display effect of playing the fingerprint animation is not necessarily the same as that shown in FIG. 4A. A partial fingerprint is gradually increased to a complete fingerprint, or A1 to A11 may be displayed in any playing order.

Step 705: The decoding module in the mobile phone 100 reads display duration duration of the $i^{th}$ frame of fingerprint from the frame_info field in the JSON file used for playing the fingerprint animation, and displays the ith frame of fingerprint for the duration duration.

In other words, an attribute display effect of frame_info of the first frame of image is read. "duration" indicates playing duration of current frame image information, for example, 37 milliseconds, that is, the current image is displayed for 37 milliseconds. In some other embodiments, more effect attribute parameters of an animation playing program file may be extended based on a use service scenario. For example, each frame of image is displayed in a gradient manner or a flying manner, but is not limited thereto.

Step 706: The decoding module in the mobile phone 100 determines whether i is less than 11. If i is less than 11, step 702 is performed. When i is less than 11, it indicates that the process of playing the fingerprint animation still needs to be continued, and the processing process in step 702 is cyclically performed until the whole process of playing the fingerprint animation is completed. If i is not less than 11, step 707 is performed.

Step 707: The mobile phone 100 displays the base image, and displays duration duration read from the JSON file.

The mobile phone 100 displays the base image based on the read base image information.

When playing of the fingerprint animation ends, the process ends.

The prompt file may be the fingerprint prompt file, or may be a prompt file in another application scenario, for example, a face prompt file that guides the user to enter a complete face, but is not limited thereto.

Figure 8:
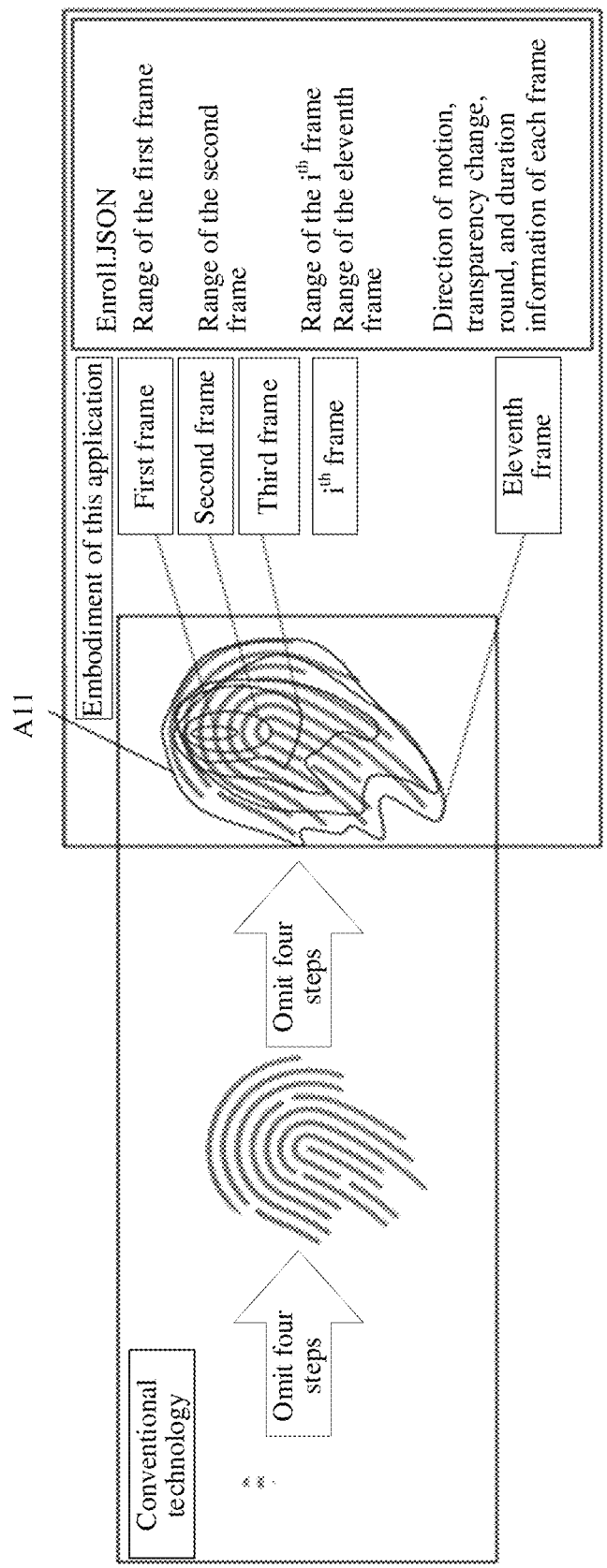
FIG. 8 is a schematic diagram of playing a fingerprint image sequence in the conventional technology and an embodiment of this application according to an embodiment of this application.

FIG. 8 is a schematic diagram of playing a fingerprint image sequence in the conventional technology and an embodiment of this application according to an embodiment of this application.

As shown on the left of FIG. 8, in the conventional technology, 11 fingerprint images are sequentially played to form a fingerprint prompt file effect. For example, 11 pieces of fingerprint image information in a fingerprint image sequence are sequentially played at an interval of 37 milliseconds to form a fingerprint prompt file. However, each frame in the fingerprint prompt file needs at least one piece of fingerprint image information, and a file of the fingerprint image information has a large capacity and occupies a large amount of storage space.

In this embodiment of this application, as shown on the right of FIG. 8, only image information of a most complete fingerprint, for example, the base image A11, and contour information of each frame of fingerprint image information (for example, the fingerprint image A1 to the image A10) in non-base image information may be used for encoding. An encoding result includes a fingerprint prompt file that includes base image information, background image information, and a drive file (for example, a JSON file). The fingerprint prompt file is decoded to achieve a playing effect, and a fingerprint prompt file effect that is the same as that of playing the fingerprint image sequence in the conventional technology is achieved, thereby reducing space occupied by the fingerprint prompt file information. For example, it is assumed that, for the fingerprint prompt file when a user enters fingerprints, there is one fingerprint prompt file sequence each time the user presses a screen, and there is one fingerprint prompt file sequence when the user releases a finger. There are 86 fingerprint prompt file sequences for three forms of fingerprints (rear, in-screen, and under-screen fingerprints), and each fingerprint prompt file sequence includes 11 pieces of image information. In this case, there are 946 pieces of image information in total, and occupied storage space is 33 MB. Resource ROM usage of the fingerprint prompt file is reduced to 15% of the previous usage. By using the conventional technology shown on the left of FIG. 8, occupied memory space is: image information: 86×11=946 images, and a size: 946×35=33,110 KB, that is, 33 MB. In this embodiment of this application, occupied memory space is: memory occupied by the image information: 86×35×2=6,020 KB, that is, 6 MB, and memory occupied by the JSON file: 86×25=2,150 KB, that is, 2.15 MB. The occupied memory space is 8.15 MB in total. In this way, ROM usage is reduced to 8.15/33=24.7% of the previous usage.

Figure 9:
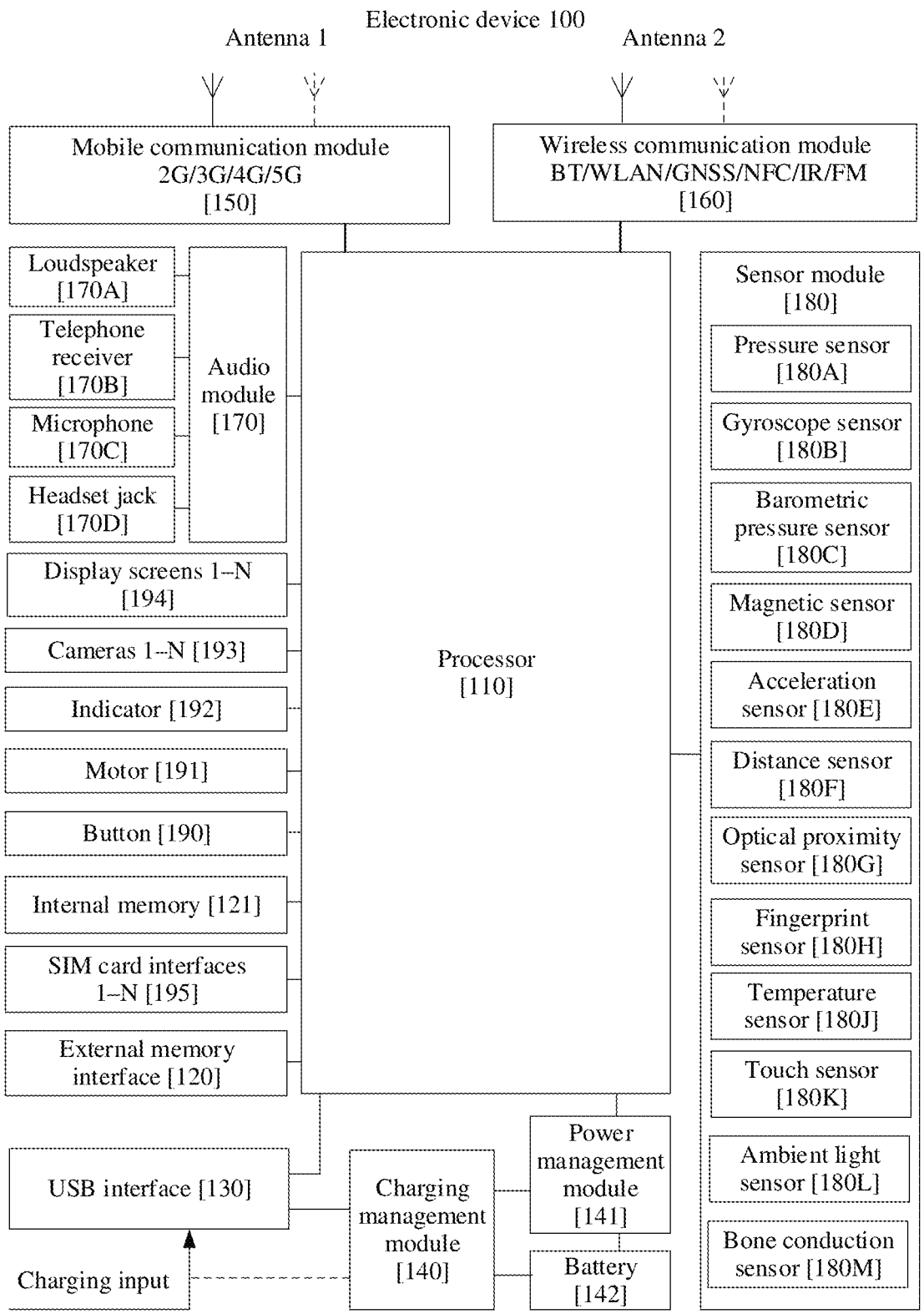
FIG. 9 is a schematic diagram of a structure of a first electronic device according to some embodiments of this application.

FIG. 9 is a schematic diagram of a structure of a first electronic device 100.

The first electronic device 100 (for example, the mobile phone 100) may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a loudspeaker 170A, a telephone receiver 170B, a microphone 170C, a headset jack 170D, a sensor module 180, a button 190, a motor 191, an indicator 192, a camera 193, a display screen 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure illustrated in this embodiment of the present invention does not constitute any specific limitation on the electronic device 100. In some other embodiments of this application, the electronic device 100 may include more or fewer components than those shown in the figure, a combination of some components, splitting of some components, or a different arrangement of the components. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit NPU). Different processing units may be independent components, or may be integrated into one or more processors.

The controller may generate an operation control signal based on instruction operation code and a sequence signal, to control instruction fetching and instruction execution.

The processor 110 may be further provided with a memory, configured to store instructions and data. In some embodiments, the memory in the processor 110 is a cache memory. The memory may store instructions or data recently used or cyclically used by the processor 110. If the processor 110 needs to use the instructions or data again, the processor 110 may directly invoke the instructions or data from the memory. This avoids repeated access and reduces a waiting time of the processor 110, thereby improving system efficiency. In this embodiment of this application, the processor 110 may store instructions for performing a method for prompting function setting. For example, when a user performs a fingerprint pressing operation in a fingerprint collection area, the processor 110 responds to the fingerprint pressing operation performed in the fingerprint collection area, that is, responds to an operation performed by the user for playing a prompt file, and generates at least one frame of fingerprint image in the prompt file, to prompt the user to record a complete fingerprint, so that the processor 110 collects complete or relatively complete fingerprint information from a fingerprint collector. Alternatively, instructions for playing the prompt file may be stored. For example, a process in which an incomplete fingerprint is morphed into a complete fingerprint is played in response to the operation performed by the user for playing the prompt file, to indicate the user to record complete fingerprint information in a fingerprint recording process. Alternatively, instructions for producing the prompt file may be stored. For example, an image sequence needed to produce the fingerprint prompt file is obtained. The image sequence includes a base image, a background image, and a plurality of frames of non-base images. The base image includes a purple complete fingerprint to be presented in the prompt file, the background image includes a light-color complete fingerprint, and the non-base images include parts of the purple complete fingerprint. Contour information of the parts of the purple complete fingerprint in the non-base images in the image sequence is obtained, and the prompt file is generated based on the base image, the background image, and the fingerprint contour information of the parts of the purple complete fingerprint in the plurality of frames of non-base images.

It can be understood that an interface connection relationship between the modules that is described in this embodiment of the present invention is merely an example for description, and does not constitute any limitation on the structure of the electronic device 100. In some other embodiments of this application, the electronic device 100 may alternatively use an interface connection mode different from that in the foregoing embodiment or use a combination of a plurality of interface connection modes.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may be further multiplexed to improve antenna utilization. For example, the antenna 1 may be multiplexed into a diversity antenna in a wireless local area network. In some other embodiments, an antenna may be used in combination with a tuning switch.

The mobile communication module 150 may provide wireless communication solutions, including 2G, 3G, 4G, 5G, and the like, applied to the electronic device 100. The mobile communication module 150 may include at least one filter, a switch, a power amplifier, a low noise amplifier (LNA), and the like. The mobile communication module 150 may receive an electromagnetic wave through the antenna 1, perform filtering, amplification, and other processing on the received electromagnetic wave, and transfer a processed electromagnetic wave to the modem processor for demodulation. The mobile communication module 150 may further amplify a signal modulated by the modem processor, convert an amplified signal into an electromagnetic wave by using the antenna 1, and radiate the electromagnetic wave through the antenna 1. In some embodiments, at least some functional modules of the mobile communication module 150 may be disposed in the processor 110. In some embodiments, at least some functional modules of the mobile communication module 150 may be disposed in a same component as at least some modules of the processor 110. In this embodiment of this application, the mobile phone 100 may receive the fingerprint prompt file sent by the server 200, for example, an animation installation package including the fingerprint prompt file.

The wireless communication module 160 may provide wireless communication solutions applied to the electronic device 100, for example, a wireless local area network (WLAN) (for example, wireless fidelity (Wi-Fi) network), Bluetooth (BT), a global navigation satellite system (GNSS), frequency modulation (FM), near field communication (NFC), and an infrared (IR) technology. The wireless communication module 160 may be one or more components integrated with at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, convert a processed signal into an electromagnetic wave by using the antenna 2, and radiate the electromagnetic wave through the antenna 2. In this embodiment of this application, the mobile phone 100 may receive the fingerprint prompt file sent by the server 200, for example, the animation installation package including the fingerprint prompt file.

The electronic device 100 implements a display function by using the GPU, the display screen 194, the application processor, and the like. The GPU is a microprocessor for image processing, and is connected to the display screen 194 and the application processor. The GPU is configured to perform mathematical and geometric calculation, and perform graphics rendering. The processor 110 may include one or more GPUs that execute program instructions to generate or change display information. In this embodiment of this application, the mobile phone 100 may play a video, for example, play the fingerprint prompt file, or an animation in which an incomplete fingerprint is morphed into a complete fingerprint.

The internal memory 121 may be configured to store computer executable program code, where the executable program code includes instructions. The internal memory 121 may include a program storage area and a data storage area. The program storage area may store an operating system, an application needed by at least one function (for example, a voice playing function or an image playing function), and the like. The data storage area may store data (such as audio data and a phone book) created during use of the electronic device 100, and the like. In addition, the internal memory 121 may include a high-speed random access memory, or may include a non-volatile memory, for example, at least one magnetic disk storage device, a flash memory device, or a universal flash storage (UFS). The processor 110 runs the instructions stored in the internal memory 121 and/or the instructions stored in the memory disposed in the processor, to perform various function applications and data processing of the electronic device 100. In this embodiment of this application, the processor 110 may store the instructions for performing the method for prompting function setting. For example, when the user performs the fingerprint pressing operation in the fingerprint collection area, the processor 110 responds to the fingerprint pressing operation performed in the fingerprint collection area, that is, responds to the operation performed by the user for playing the prompt file, and generates the at least one frame of fingerprint image in the prompt file, to prompt the user to record the complete fingerprint, so that the processor 110 collects the complete or relatively complete fingerprint information from the fingerprint collector. Alternatively, the instructions for playing the prompt file may be stored. For example, the process in which the incomplete fingerprint is morphed into the complete fingerprint is played in response to the operation performed by the user for playing the prompt file, to indicate the user to record the complete fingerprint information in the fingerprint recording process. Alternatively, the instructions for producing the prompt file may be stored. For example, the image sequence needed to produce the fingerprint prompt file is obtained. The image sequence includes the base image, the background image, and the plurality of frames of non-base images. The base image includes the purple complete fingerprint to be presented in the prompt file, the background image includes the light-color complete fingerprint, and the non-base images include the parts of the purple complete fingerprint. The contour information of the parts of the purple complete fingerprint in the non-base images in the image sequence is obtained, and the prompt file is generated based on the base image, the background image, and the fingerprint contour information of the parts of the purple complete fingerprint in the plurality of frames of non-base images.

The button 190 includes an on/off button, a volume button, and the like. The button 190 may be a mechanical button, or may be a touch button.

A software system of the electronic device 100 may use a layered architecture, an event driven architecture, a microkernel architecture, a microservices-based architecture, or a cloud architecture. In this embodiment of the present invention, an Android system of a layered architecture is used as an example for describing a software structure of the electronic device 100.

Figure 10:
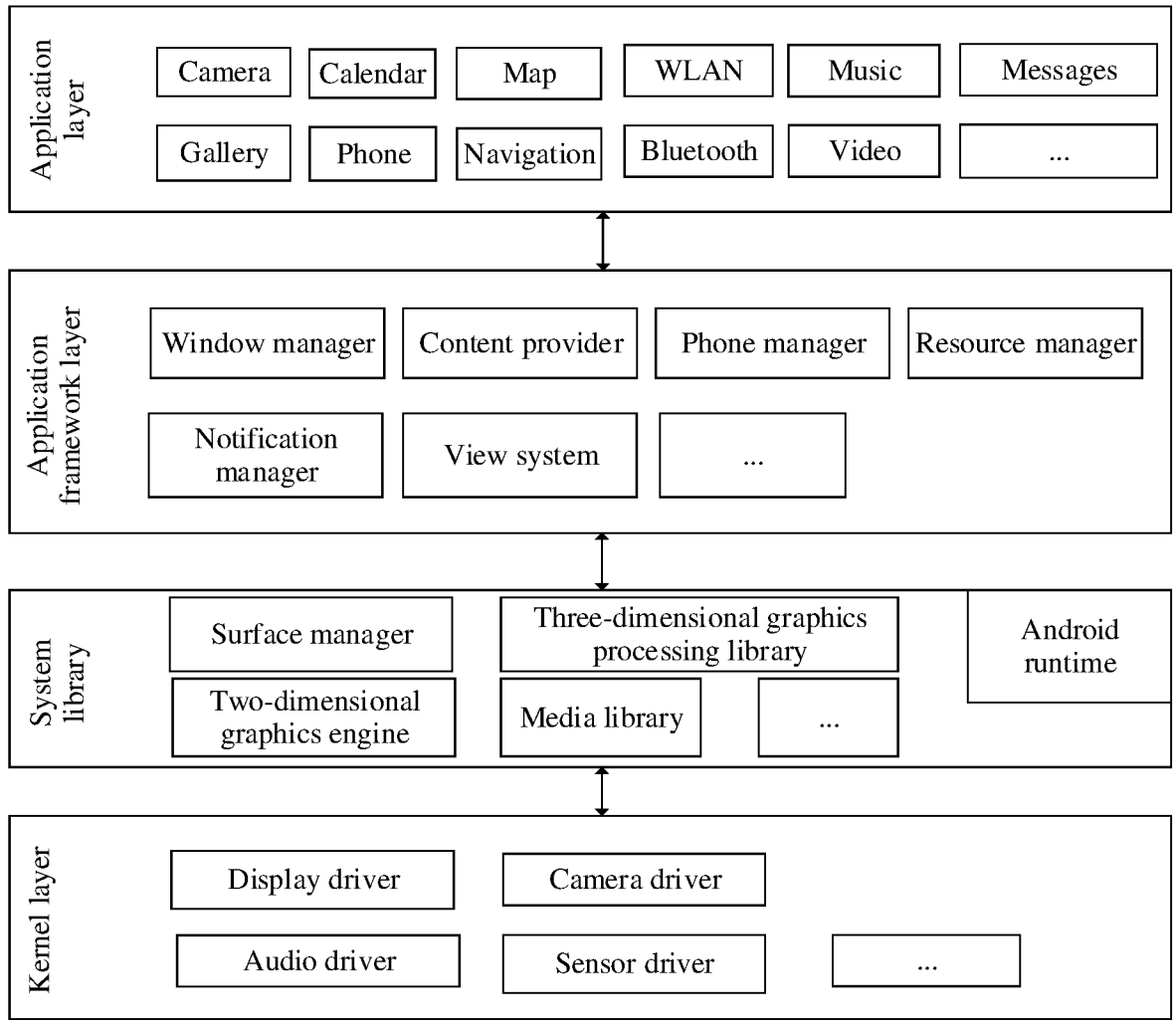
FIG. 10 is a block diagram of a software structure of a first electronic device according to some embodiments of this application.

FIG. 10 is a block diagram of a software structure of an electronic device 100 according to an embodiment of the present invention.

In the layered architecture, software is divided into several layers, and each layer has clear roles and tasks. The layers communicate with each other through a software interface. In some embodiments, the Android system is divided into four layers from top to bottom: an application layer, an application framework layer, an Android runtime and system library, and a kernel layer.

The application layer may include a series of application packages.

As shown in FIG. 10, the application packages may include applications such as camera, gallery, calendar, phone, map, navigation, WLAN, Bluetooth, music, video, messages, and settings including a prompt file.

The application framework layer provides an application programming interface (API) and a programming framework for an application at the application layer. The application framework layer includes some predefined functions.

As shown in FIG. 10, the application framework layer may include a window manager, a content provider, a view system, a phone manager, a resource manager, a notification manager, and the like.

The window manager is configured to manage a window program. The window manager may obtain a size of a display screen, determine whether there is a status bar, perform screen locking, take a screenshot, and the like.

The content provider is configured to: store and obtain data, and enable the data to be accessible by an application. The data may include a video, an image, audio, calls that are made and answered, a browsing history and a bookmark, a phone book, and the like.

The view system includes visual controls, for example, a control for text display or a control for image display. The view system may be configured to construct an application. A display interface may include one or more views.

The phone manager is configured to provide a communication function of the electronic device 100.

The resource manager provides applications with various resources such as a localized character string, an icon, an image, a layout file, and a video file.

The notification manager enables an application to display notification information in a status bar, and may be configured to convey a notification type message. The notification manager may automatically disappear after a short pause without a need for a user interaction. For example, the notification manager is configured to notify download completion and provide a message alert. The notification manager may alternatively provide a notification that appears in a top status bar of the system in a form of a graph or a scroll bar text, for example, a notification of an application running in a background, or may provide a notification that appears on a screen in a form of a dialog box. For example, text information is displayed in the status bar, an alert tone is provided, the electronic device vibrates, or an indicator light flashes.

The Android runtime includes a core library and a virtual machine. The Android runtime is responsible for scheduling and management of the Android system.

The core library includes two parts: a performance function that needs to be called in a java language, and an Android core library.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of functional modules, such as a surface manager), a media library, a three-dimensional graphics processing library (for example, an OpenGL ES), and a 2D graphics engine (for example, an SGL).

The surface manager is configured to manage a display subsystem, and fuse 2D and 3D layers for a plurality of applications.

The media library supports playback and recording in a plurality of commonly used audio and video formats, and supports static image files and the like. The media library can support a plurality of audio and video encoding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

Embodiments disclosed in this application may be implemented by using hardware, software, firmware, or a combination of these implementation means. Embodiments of this application may be implemented by using a computer program or program code that is executed on a programmable system, and the programmable system includes at least one processor, a storage system (including volatile and non-volatile memories and/or a storage element), at least one input device, and at least one output device.

The program code may be used for inputting instructions, to perform functions described in this application and generate output information. The output information may be applied to one or more output devices in a known manner. To implement this application, a processing system includes any system with a processor, for example, a digital signal processor (DSP), a microcontroller, an application-specific integrated circuit (ASIC), or a microprocessor.

The program code may be implemented in a high-level procedural language or an object-oriented programming language, to communicate with the processing system. The program code may be alternatively implemented in an assembly language or a machine language when needed. Actually, the mechanism described in this application is not limited to a scope of any particular programming language. In any case, the language may be a compiled language or an interpreted language.

In some cases, the disclosed embodiments may be implemented by hardware, firmware, software, or any combination thereof. The disclosed embodiments may be alternatively implemented by using instructions carried by or stored on one or more temporary or non-temporary machine-readable (for example, computer-readable) storage media, and the instructions may be read and executed by one or more processors. For example, the instructions may be distributed through a network or another computer-readable medium. The machine-readable medium may include any mechanism for storing or transmitting information in a machine (for example, a computer) readable form, including but not limited to a floppy disk, a compact disc, an optical disc, a compact disc read-only memory (CD-ROMs), a magneto-optical disk, a read-only memory (ROM), a random access memory (RAM), an erasable programmable read-only memory (EPROM), an electrically erasable programmable read-only memory (EEPROM), a magnetic card, an optical card, a flash memory, or a tangible machine-readable memory configured to transmit information (for example, a carrier, an infrared signal, or a digital signal) by using a propagating signal in an electrical, optical, acoustic, or another form over the Internet. Therefore, the machine-readable medium includes any type of machine-readable medium that is suitable for storing or transmitting electronic instructions or information in a machine (for example, a computer) readable form.

In the accompanying drawings, some structural or method features may be shown in a particular arrangement and/or order. However, it should be understood that such a particular arrangement and/or order may not be needed. In some embodiments, these features may be arranged in a manner and/or order different from those/that shown in the descriptive accompanying drawings. In addition, inclusion of the structural or method features in a particular figure does not imply that such features are needed in all embodiments, and in some embodiments, these features may not be included or may be combined with other features.

It should be noted that all units/modules mentioned in the device embodiments of this application are logical units/modules. Physically, one logical unit/module may be one physical unit/module, may be a part of one physical unit/module, or may be implemented by using a combination of a plurality of physical units/modules. Physical implementations of these logical units/modules are not the most important, and a combination of functions implemented by these logical units/modules is a key to resolving technical issues proposed in this application. In addition, to highlight an innovative part of this application, a unit/module that is not closely related to resolving the technical issues proposed in this application is not introduced in the foregoing device embodiments of this application. This does not mean that there are no other units/modules in the foregoing device embodiments.

It should be noted that in the examples and the specification of this patent, relational terms such as first and second are used only to differentiate an entity or operation from another entity or operation, and do not require or imply that any actual relationship or sequence exists between these entities or operations. Moreover, terms "include", "contain", or any other variants thereof are intended to cover a non-exclusive inclusion, so that a process, a method, an article, or a device that includes a list of elements includes those elements, and also includes other elements which are not expressly listed, or further includes elements inherent to this process, method, article, or device. An element preceded by a statement "includes a" does not, without more constraints, preclude the presence of additional identical elements in the process, method, article, or device that includes the element.

Although this application has been illustrated and described with reference to some preferred embodiments of this application, a person of ordinary skill in the art should understand that various changes may be made to this application in form and detail without departing from the spirit and scope of this application.

What is claimed is:

1. A method comprising:
    displaying, by an electronic device, a first sequence frame image of a prompt file in response to a first operation performed by a user; and
    displaying, by the electronic device, a second sequence frame image of the prompt file in response to a second operation performed by the user,
    wherein the prompt file comprises at least first-part contour information and second-part contour information of a playing object, and the prompt file further comprises first image information and second image information, the first image information comprises the playing object and a background of the playing object, and the second image information comprises the background of the playing object,
    wherein the first sequence frame image is generated based on the first-part contour information of the playing object, wherein the first-part contour information comprises coordinate values of a contour of a first part of the playing object, a first transparent area of the second image information is constructed based on the coordinate values of the contour of the first part of the playing object, to obtain first constructed second image information, and the first constructed second image information is superimposed on the first image information, to display the first sequence frame image comprising the first part of the playing object, and wherein the second sequence frame image is generated based on the second-part contour information of the playing object and comprises content of the first sequence frame image, wherein the second-part contour information comprises coordinate values of a contour of a second part of the playing object, a second transparent area of the second image information is constructed based on the coordinate values of the contour of the second part of the playing object, to obtain second constructed second image information, and the second constructed second image information is superimposed on the first image information, to display the second sequence frame image comprising the second part of the playing object.

2. The method according to claim 1, wherein the playing object is a fingerprint.

3. The method according to claim 2, wherein the first image information comprises a complete fingerprint having a first color, and wherein the second image information further comprises a complete fingerprint having a second color.

4. The method according to claim 3, wherein the second color is lighter than the first color.

5. The method according to claim 1, wherein a first displayed sequence frame image is generated based on the second image information, and wherein a last displayed sequence frame image is generated based on the first image information.

6. The method according to claim 1, wherein a carrier of the at least first-part contour information and the second-part contour information of the playing object is a JSON file.

7. The method according to claim 1, wherein the prompt file does not comprise the first sequence frame image or the second sequence frame image.

8. An electronic device comprising:
at least one processor configured to:
display a first sequence frame image of a prompt file in response to a first operation performed by a user; and
display a second sequence frame image of the prompt file in response to a second operation performed by the user,
wherein the prompt file comprises at least first-part contour information and second-part contour information of a playing object, and the prompt file further comprises first image information and second image information, the first image information comprises the playing object and a background of the playing object, and the second image information comprises the background of the playing object,
wherein the first sequence frame image is generated based on the first-part contour information of the playing object, wherein the first-part contour information comprises coordinate values of a contour of a first part of the playing object, a first transparent area of the second image information is constructed based on the coordinate values of the contour of the first part of the playing object, to obtain first constructed second image information, and the first constructed second image information is superimposed on the first image information, to display the first sequence frame image comprising the first part of the playing object, and wherein the second sequence frame image is generated based on the second-part contour information of the playing object and comprises content of the first sequence frame image, wherein the second-part contour information comprises coordinate values of a contour of a second part of the playing object, a second transparent area of the second image information is constructed based on the coordinate values of the contour of the second part of the playing object, to obtain second constructed second image information, and the second constructed second image information is superimposed on the first image information, to display the second sequence frame image comprising the second part of the playing object.

9. The electronic device according to claim 8, wherein the playing object is a fingerprint.

10. The electronic device according to claim 8, wherein the prompt file does not comprise the first sequence frame image or the second sequence frame image.

11. A method comprising:
generating, by an electronic device, at least a first sequence frame image and a second sequence frame image in response to an operation performed by a user for playing a prompt file; and
playing, by the electronic device, the first sequence frame image and the second sequence frame image in a predetermined order,
wherein the prompt file comprises at least first-part contour information and second-part contour information of a playing object, and the prompt file further comprises first image information and second image information, the first image information comprises the playing object and a background of the playing object, and the second image information comprises the background of the playing object,
wherein the first sequence frame image is generated based on the first-part contour information of the playing object, wherein the first-part contour information comprises coordinate values of a contour of a first part of the playing object, a first transparent area of the second image information is constructed based on the coordinate values of the contour of the first part of the playing object, to obtain first constructed second image information, and the first constructed second image information is superimposed on the first image information, to display the first sequence frame image comprising the first part of the playing object; and wherein the second sequence frame image is generated based on the second-part contour information of the playing object and comprises content of the first sequence frame image, wherein the second-part contour information comprises coordinate values of a contour of a second part of the playing object, a second transparent area of the second image information is constructed based on the coordinate values of the contour of the second part of the playing object, to obtain second constructed second image information, and the second constructed second image information is superimposed on the first image information, to display the second sequence frame image comprising the second part of the playing object.

12. The method according to claim 11, wherein the playing object is a fingerprint.

13. The method according to claim 12, wherein the first image information comprises a complete fingerprint having a first color, and wherein the second image information further comprises a complete fingerprint having a second color.

14. The method according to claim 13, wherein the second color is lighter than the first color.

15. The method according to claim 11, wherein the prompt file further comprises a playing duration of each of the first sequence frame image and the second sequence frame image.

16. The method according to claim 15, wherein, while playing each of the first sequence frame image and the second sequence frame image, playing is performed based on the playing duration corresponding to the first and second image.

17. The method according to claim 11, wherein a carrier of the at least first-part contour information and the second-part contour information of the playing object is a JSON file.

18. The method according to claim 11, wherein the prompt file does not comprise the first sequence frame image or the second sequence frame image.

19. An electronic device comprising:
at least one processor configured to:
  generate at least a first sequence frame image and a second sequence frame image in response to an operation performed by a user for playing a prompt file; and
  play the first sequence frame image and the second sequence frame image in a predetermined order,
wherein the prompt file comprises at least first-part contour information and second-part contour information of a playing object, and the prompt file further comprises first image information and second image information, the first image information comprises the playing object and a background of the playing object, and the second image information comprises the background of the playing object,
wherein the first sequence frame image is generated based on the first-part contour information of the playing object, wherein the first-part contour information comprises coordinate values of a contour of a first part of the playing object, a first transparent area of the second image information is constructed based on the coordinate values of the contour of the first part of the playing object, to obtain first constructed second image information, and the first constructed second image information is superimposed on the first image information, to display the first sequence frame image comprising the first part of the playing object, and
wherein the second sequence frame image is generated based on the second-part contour information of the playing object and comprises content of the first sequence frame image, wherein the second-part contour information comprises coordinate values of a contour of a second part of the playing object, a second transparent area of the second image information is constructed based on the coordinate values of the contour of the second part of the playing object, to obtain second constructed second image information, and the second constructed second image information is superimposed on the first image information, to display the second sequence frame image comprising the second part of the playing object.

20. The electronic device according to claim 19, wherein the prompt file does not comprise the first sequence frame image or the second sequence frame image.

\* \* \* \* \*